US010472842B2

(12) United States Patent
Lee

(10) Patent No.: US 10,472,842 B2
(45) Date of Patent: Nov. 12, 2019

(54) AUTOMATED PARKING LOT TURNTABLE

(71) Applicant: Wan Young Lee, Seoul (KR)

(72) Inventor: Wan Young Lee, Seoul (KR)

( * ) Notice: Subject to any disclaimer, the term of this patent is extended or adjusted under 35 U.S.C. 154(b) by 328 days.

(21) Appl. No.: 15/112,679

(22) PCT Filed: Jan. 20, 2015

(86) PCT No.: PCT/KR2015/000579
§ 371 (c)(1),
(2) Date: Dec. 20, 2016

(87) PCT Pub. No.: WO2015/108399
PCT Pub. Date: Jul. 23, 2015

(65) Prior Publication Data
US 2017/0089088 A1 Mar. 30, 2017

(30) Foreign Application Priority Data

Jan. 20, 2014 (KR) .................... 10-2014-0006496

(51) Int. Cl.
*E04H 6/28* (2006.01)
*E04H 6/40* (2006.01)
(Continued)

(52) U.S. Cl.
CPC ............. *E04H 6/28* (2013.01); *E04H 6/22* (2013.01); *E04H 6/285* (2013.01); *E04H 6/40* (2013.01);
(Continued)

(58) Field of Classification Search
CPC .. E04H 6/287; E04H 6/22; E04H 6/28; E04H 6/40; E04H 6/422; E04H 6/285
See application file for complete search history.

(56) References Cited

U.S. PATENT DOCUMENTS 5,108,254 A * 4/1992 Go ..................... E04H 6/287
414/231
5,915,907 A * 6/1999 Yatou ................. E04H 6/287
104/44
(Continued)

FOREIGN PATENT DOCUMENTS

DE          10047050 A1 *  4/2001  ............... E04H 6/28
EP          1255002 A1  * 11/2002  ............. E04H 6/186
(Continued)

*Primary Examiner* — Kaitlin S Joerger
(74) *Attorney, Agent, or Firm* — Maschoff Brennan

(57) ABSTRACT

An automated parking turntable includes a driver walking unit with a rack having multiple loading forks and a vehicle conveyor for loading and unloading a vehicle to and from the rack. The automated parking turntable further includes a rotating plate having a vehicle standby unit in which a vehicle stands by opposite a driver getting on/off door, the rotating plate rotating to change the front/rear/left/right direction of the vehicle. Multiple fork bars are formed on the vehicle standby unit of the rotating plate and arranged in parallel with each other at a predetermined interval so as to be perpendicular to the direction of movement of the vehicle in the outer straight range of the rotating plate. The multiple fork bars include front and rear fork groups spaced from each other to support the front wheels and rear wheels of the vehicle, respectively.

23 Claims, 8 Drawing Sheets

(51) Int. Cl.
*E04H 6/22* (2006.01)
*E04H 6/42* (2006.01)
*F16H 19/00* (2006.01)

(52) U.S. Cl.
CPC ........... *E04H 6/422* (2013.01); *F16H 19/001* (2013.01); *F16H 2019/008* (2013.01)

(56) References Cited

U.S. PATENT DOCUMENTS

| | | | |
|---|---|---|---|
| 5,980,185 A * | 11/1999 | Vita | E04H 6/422 414/254 |
| 6,332,743 B1 * | 12/2001 | Park | E04H 6/186 414/234 |
| 9,255,420 B2 * | 2/2016 | Dezer | E04H 6/22 |
| 2003/0035707 A1 * | 2/2003 | Volpe | E04H 6/186 414/254 |
| 2007/0128009 A1 * | 6/2007 | Lee | E04H 6/186 414/253 |

FOREIGN PATENT DOCUMENTS

| | | | | |
|---|---|---|---|---|
| JP | 10-072947 A | | 10/2005 | |
| JP | 2005-299181 A | | 10/2005 | |
| KR | 10-1999-0038657 A | | 6/1999 | |
| KR | 20150086614 A | * | 7/2015 | ............... E04H 6/22 |
| KR | 10-2006-0032046 A | | 4/2016 | |

* cited by examiner

[Fig. 1]
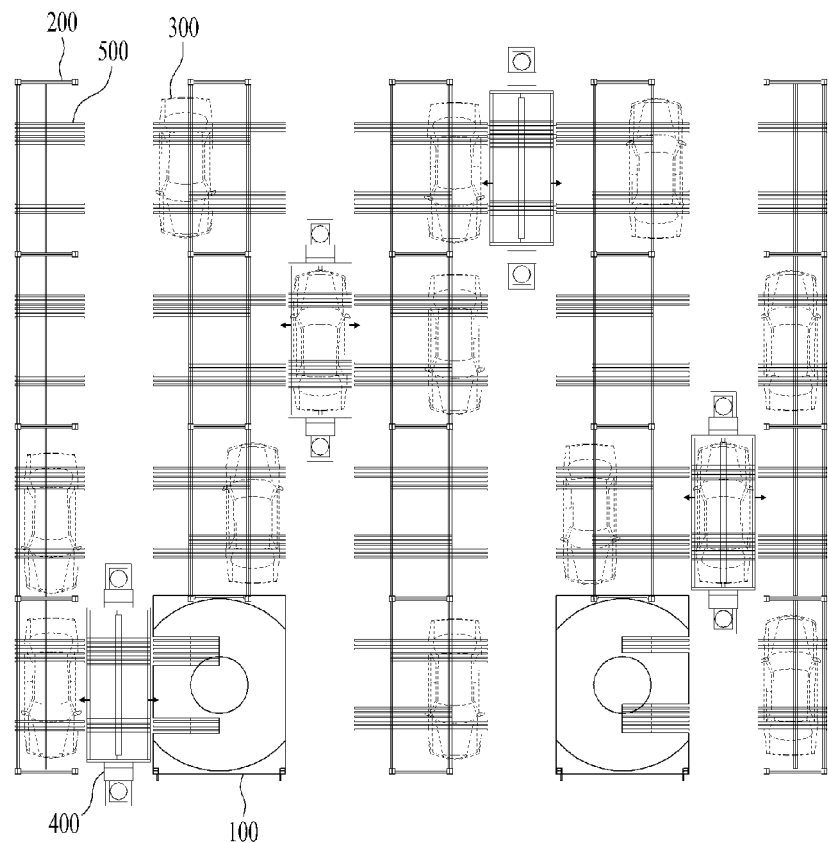
[Fig. 2]
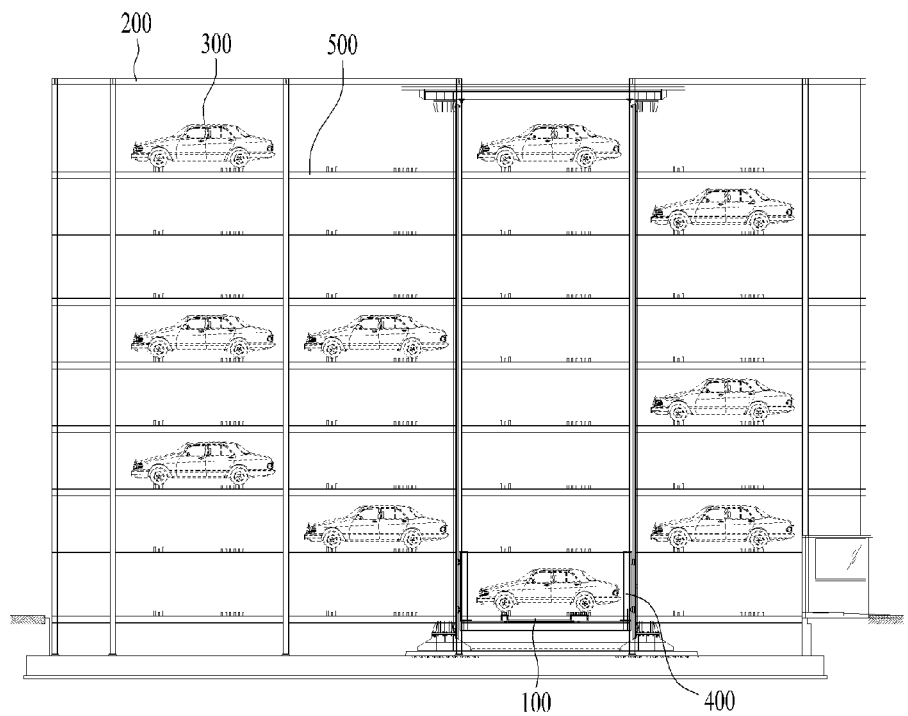

[Fig. 3]
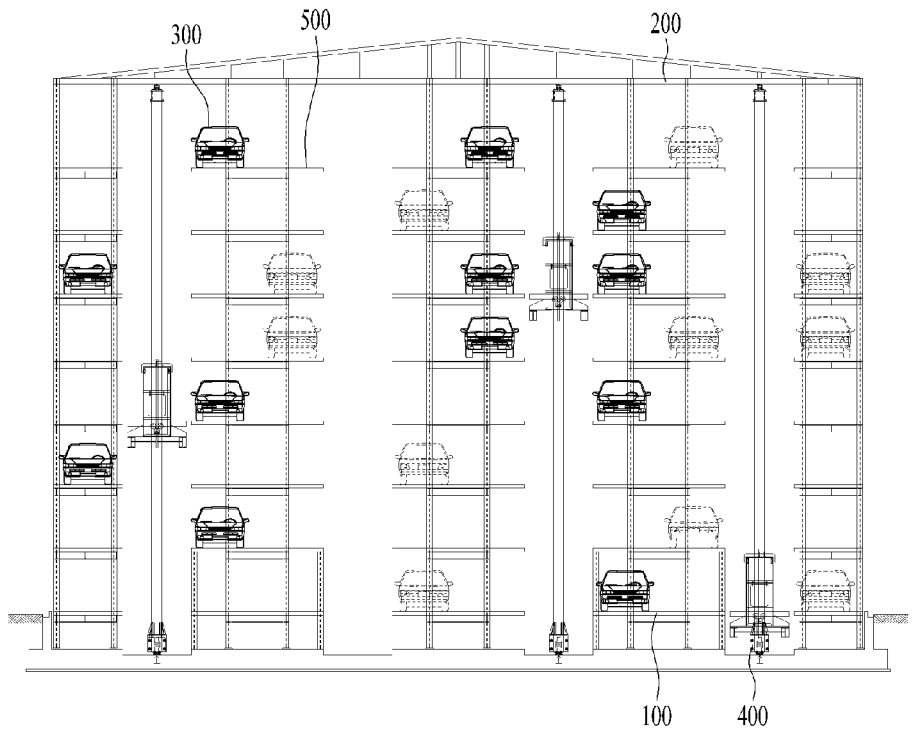
[Fig. 4]
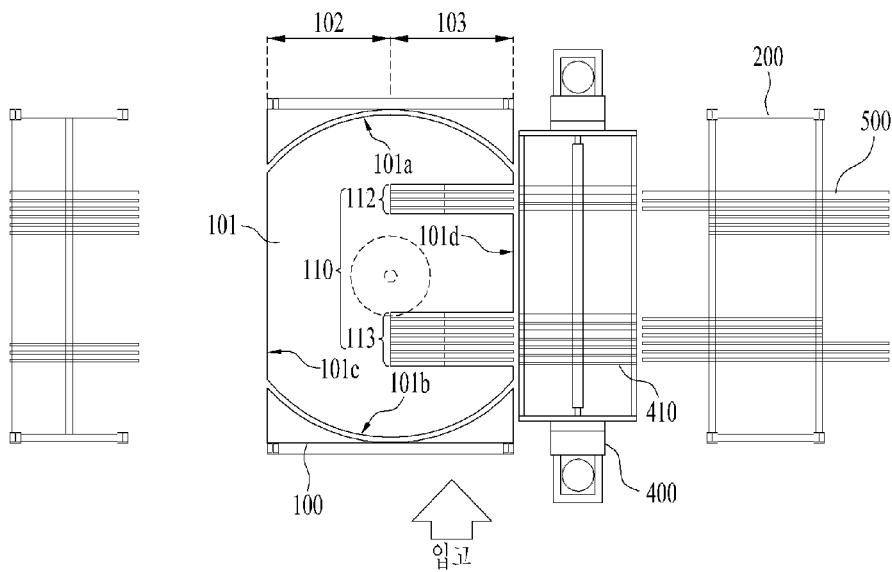

[Fig. 5]
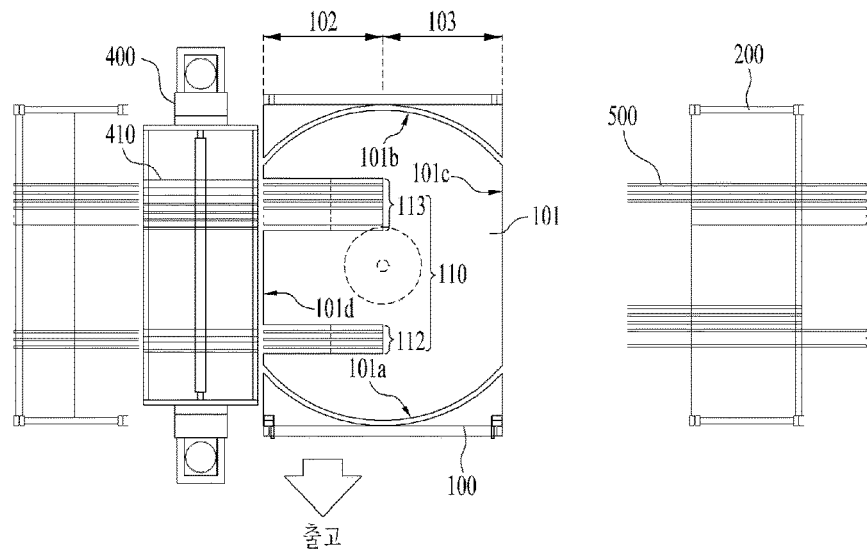
출고
[Fig. 6]
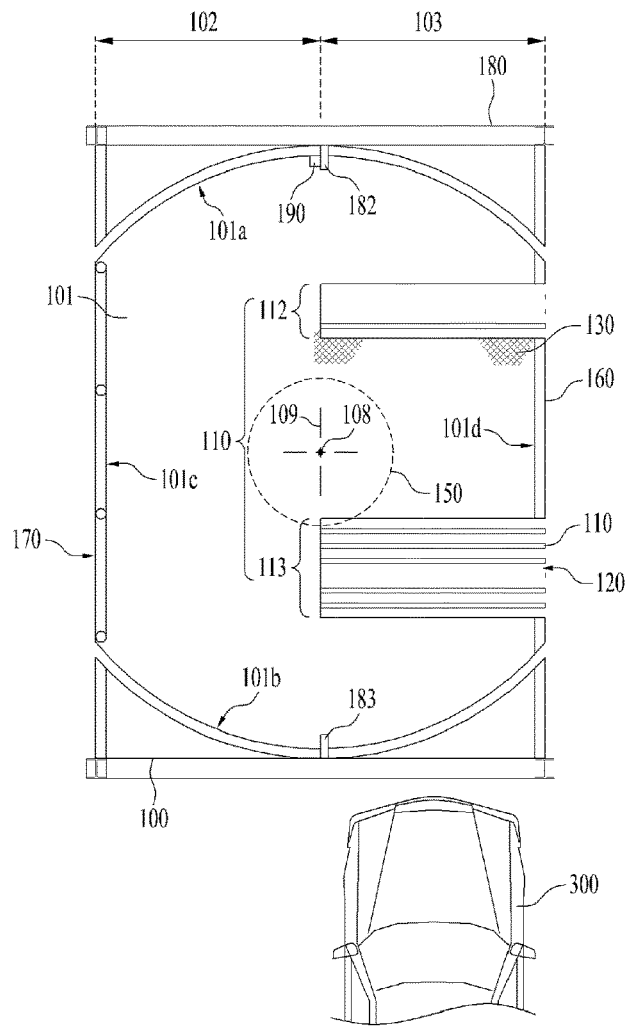

[Fig. 7]
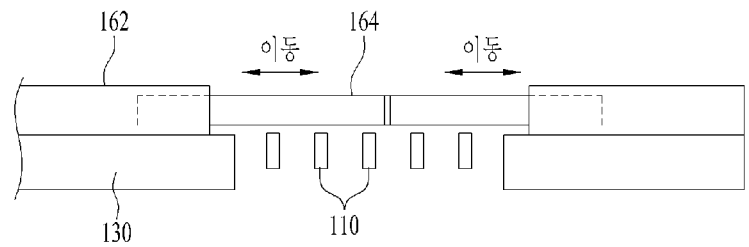
[Fig. 8]
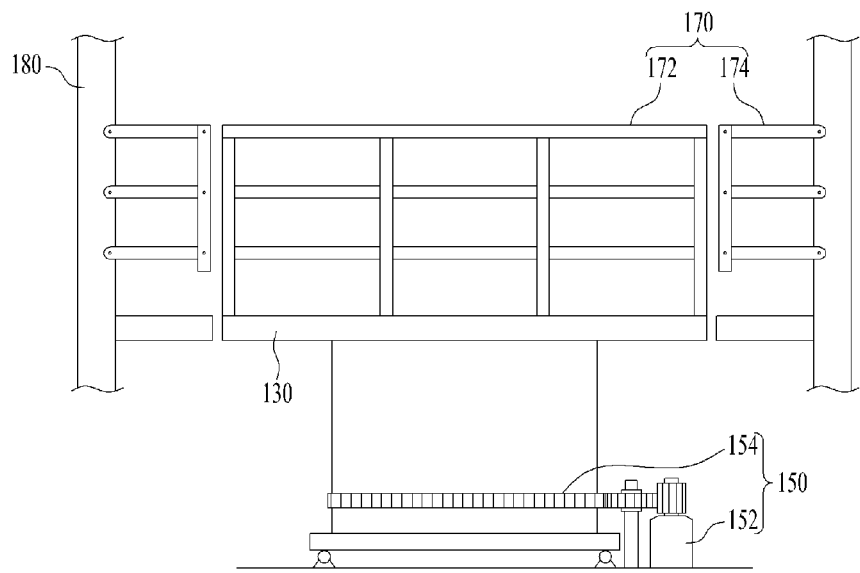
[Fig. 9a]
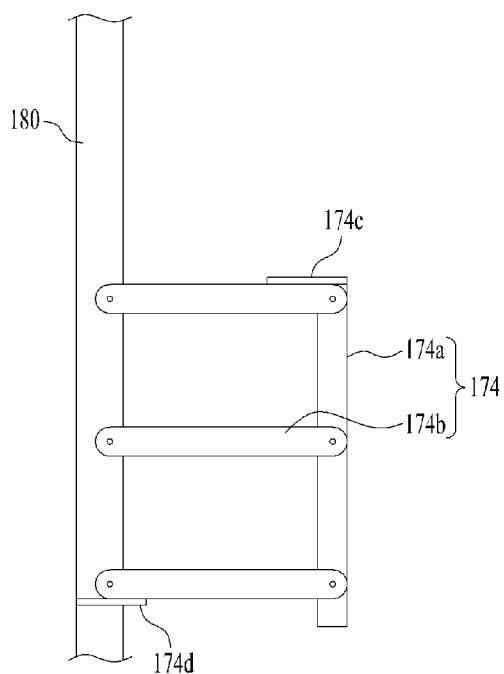

[Fig. 9b]
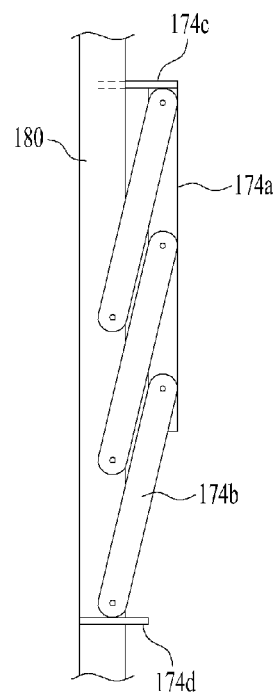
[Fig. 10]
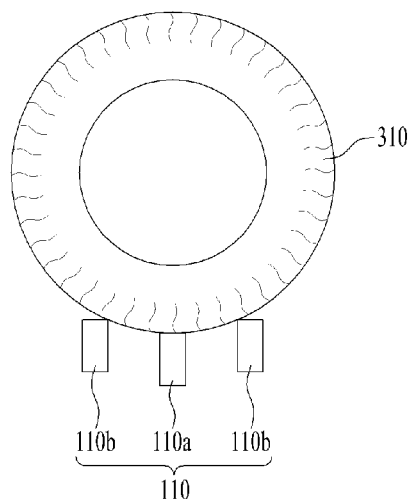

[Fig. 11]
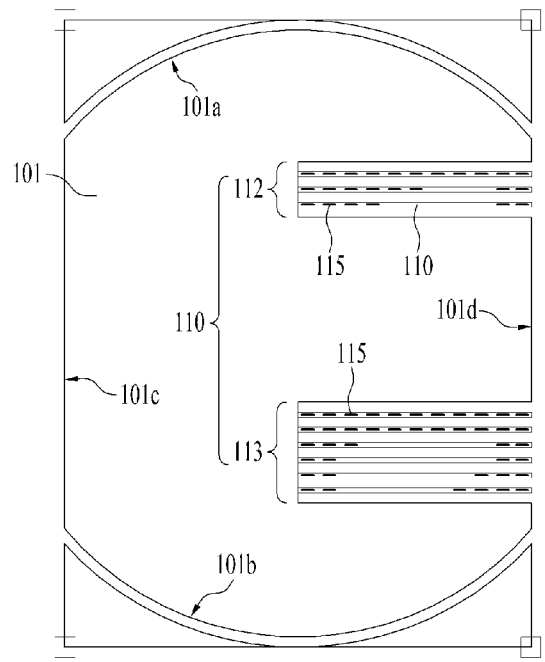
[Fig. 12]
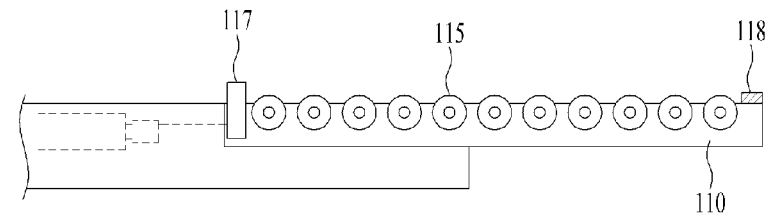
[Fig. 13]
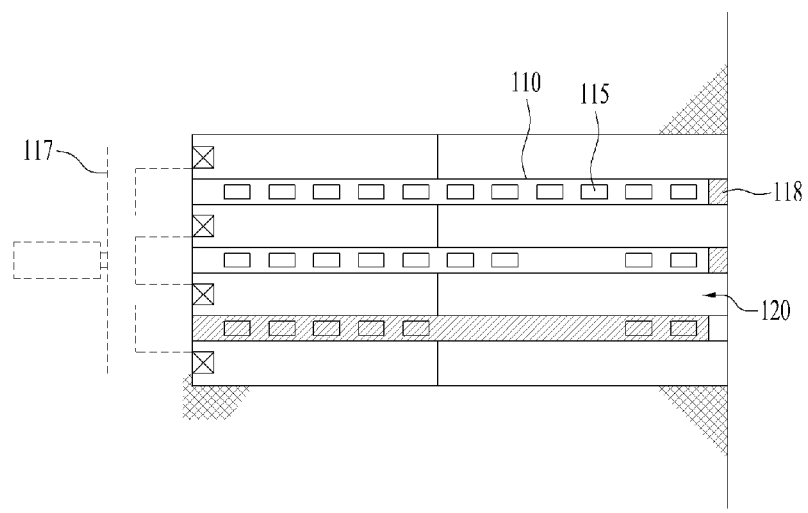

[Fig. 14]
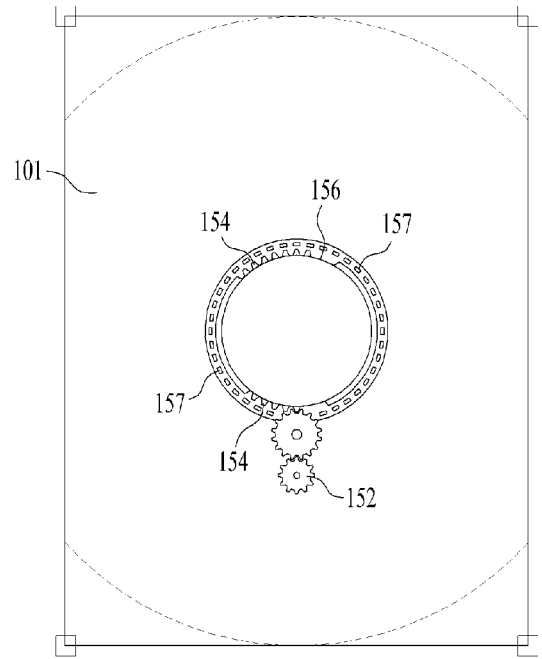
[Fig. 15]
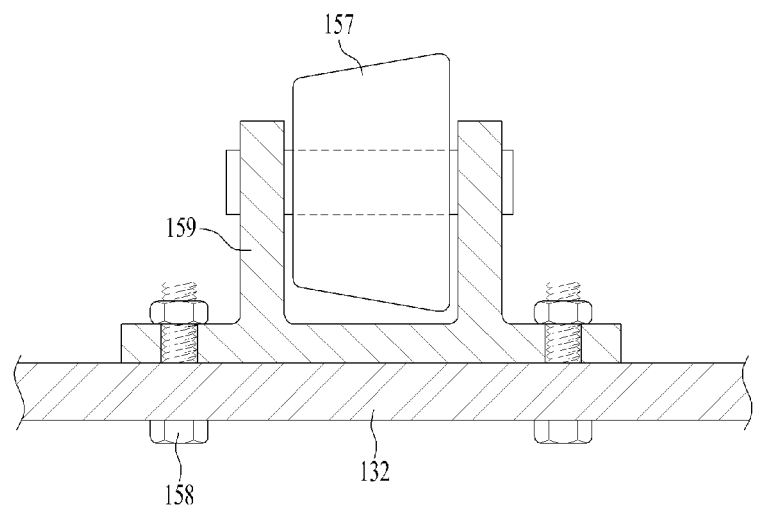

[Fig. 16]
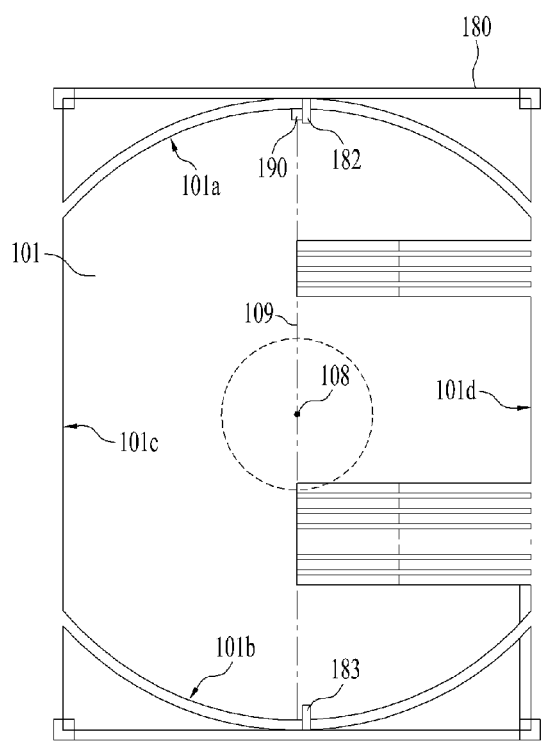

AUTOMATED PARKING LOT TURNTABLE

TECHNICAL FIELD

The present invention relates to an automated parking lot turntable, and more particularly, to an automated parking lot turntable by which drivers can get vehicles in and out safely and easily.

BACKGROUND ART

As vehicles are increasingly used, the parking problem is becoming a serious social problem with traffic congestion and air pollution due to the lack of parking spaces.

In particular, in the city center where vehicle traffic is heavy, the parking problem is more serious due to limited parking spaces.

Accordingly, in order to cope with increased demand for parking, many methods for solving the parking problem, such as mandating that every building should be provided with a parking lot, have been attempted, but expanding parking facilities has reached its limit due to limited premises.

Therefore, a parking system which loads vehicles on multiple levels stacked using a machine in order to park many vehicles in a small space efficiently has been used.

Such a parking system is divided into a rotary type parking system, a puzzle type parking system, an elevator type parking system, or the like according to a driving method, and the elevator type parking system which can get vehicles in and out easily and rapidly is preferred.

In the elevator type parking system, racks having a plurality of loading spaces formed thereon in a lattice pattern are installed at regular intervals, and a conveying device for conveying vehicles, such as a lift or a stacker crane, is provided in a space between the racks. This system can automatically get vehicles in and out by the conveying device interworking with a control computer.

The elevator type parking system may include a turntable on which a vehicle stands by to be get in and out.

The turntable of the parking system is a device which rotates a vehicle according to the position of the conveying device for conveying vehicles, and convey the vehicle to the conveying device.

Accordingly, since the turntable of the parking system is a place where drivers wait and go in and out in order to get their vehicles in and out, the turntable should be safe and vehicles should be placed in an accurate position.

However, the related-art turntable has a problem that the conveying device should wait for long time in order for a driver to get a vehicle out every time the drivers gets the vehicles out.

In addition, since the related-art turntable is not provided with a safety device such as a guard rail, there is a problem that safety is not guaranteed when a driver goes in and out.

In addition, since the related-art turntable does not have a guide device for guiding a vehicle to a designated position when a driver gets the vehicle in, it may take much time for the driver to seat the vehicle in the designated position, and also, since the driver may seat the vehicle in an inaccurate position, there may be a problem that the vehicle is damaged.

DETAILED DESCRIPTION OF THE PRESENT DISCLOSURE

Technical Objects

The technical object of exemplary embodiments of the present invention is to provide an automated parking lot turntable which includes a rotary plate having a front side and a rear side formed in an arc shape on a plane, and having left and right sides formed in a straight line, such that time and space required to get vehicles in and out of the parking lot can be reduced.

Technical Solving Means

According to an exemplary embodiment of the present invention, there is provided an automated parking lot turntable including a rack which includes a plurality of loading forks, and a vehicle conveyer for loading and unloading a vehicle to and from the rack, the turntable including: a rotary plate which rotates to change the front/rear/left/right directions of the vehicle, the front side and the rear side of the rotary plate having an arc shape, which is a part of a circle, on a plane, the left and right sides of the rotary plate being formed in a straight line, the rotary plate including a driver walking unit formed near to a driver getting on/off door on the plane, for allowing a driver to walk thereon, and a vehicle standby unit formed opposite the driver getting on/off door, for allowing the vehicle to stand by thereon; a plurality of fork bars which are formed on the vehicle standby unit of the rotary plate and are arranged in parallel with one another at predetermined intervals so as to be perpendicular to the advancing direction of the vehicle in the outer straight line section of the rotary plate, the plurality of fork bars including a front fork group and a rear fork group spaced from each other to support the front wheels and the rear wheels of the vehicle, respectively; conveying fork entry/exit passages which have narrow and long spaces formed therein and are open toward conveying forks, such that the conveying forks of the vehicle conveyer enter/exit between the fork bars one by one; a floor installed on the rotary plate except for the front and rear fork groups; and a driving unit for rotating and stopping the rotary plate.

Herein, a guide beam may be installed on the outer edge of the right side of the vehicle standby unit of the rotary plate which is formed in the straight line, for guiding the wheels of the vehicle.

The guide beam may include: a main beam which protrudes upwardly from the floor except for the front fork group and the rear fork group; and a sub beam which is mounted in the main beam, and is ejected to the outside from the main beam or inserted into the main beam according to a predetermined control signal.

A hand rail may be installed on the outer edge of the driver walking unit of the rotary plate which is formed in the straight line, for the sake of driver's safety.

The driving unit may include: an electric motor; a pinion gear which is disposed under the rotary plate to transmit power of the electric motor to the rotary plate; and a plurality of driving rollers which are arranged along the periphery of the pinion gear, for rotating the rotary plate.

The pinion gear may have an area from which a part of sawteeth of a predetermined area is removed, and the pinion gear from which the part of the sawteeth is removed may not transmit the power of the electric motor to the rotary plate so as not to rotate the rotary plate any longer after rotating by 180°.

An inner diameter of each of the driving rollers, facing the center of the rotary plate, may be smaller than an outer diameter facing the edge of the rotary plate.

The rotary plate may include a rotation restriction stopper for restricting the rotation of the rotary plate to 180°.

The rotation restriction stopper may be disposed on an edge of the front side of the rotary plate which is formed in the arc shape, and may be placed on a line extending from a horizontal axis passing through the center point of the rotary plate.

Frames may be disposed on the front side and the rear side of the rotary plate, respectively, and a 0-degree stopper may be formed on the frame disposed on the front side of the rotary plate and protrudes toward the front side of the rotary plate, and a 180-degree stopper may be formed on the frame disposed on the rear side of the rotary plate and protrudes toward the rear side of the rotary plate.

In addition, the shapes of the front side and the rear side of the rotary plate may be formed in a shape of a part of a polygon having many angles only when the rotary plate is rotatable.

Advantageous Effect

According to an exemplary embodiment of the present invention, the turntable includes the rotary plate of which the front side and the rear side are formed in an arc shape, which is a part of the circle, on the plane, and of which the left and right sides are formed in the straight line, such that time and space required to get the vehicle in and out can be reduced and parking is efficient.

In addition, in the present invention, since the hand rail is installed on the outer edge of the driver walking unit of the rotary plate which is formed in the straight line, for the sake of driver's walking safety, stability can be enhanced when the driver goes in and out.

In addition, in the present invention, since the guide beam is installed on the outer edge of the vehicle standby unit of the rotary plate which is formed in the straight line, for guiding the wheels of the vehicle, time taken for the driver to seat the vehicle in a designated position when getting the vehicle in and out can be reduced, and the vehicle can be seated in an accurate position.

BRIEF DESCRIPTION OF THE DRAWINGS

FIG. 1 is a plane view of entrance/exit levels schematically showing an automated parking lot having a turntable installed therein according to the present invention;

FIG. 2 is an elevation view schematically showing the automated parking lot having the turntable installed therein according to the present invention;

FIG. 3 is a front view schematically showing the automated parking lot having the turntable installed therein according to the present invention;

FIG. 4 is an enlarged plane view showing the turntable when a vehicle conveyer near to the entrance side of the automated parking lot is used according to the present invention;

FIG. 5 is an enlarged plane view showing the turntable when a vehicle conveyer near to the exit side of the automated parking lot is used according to the present invention;

FIG. 6 is a plane view showing the turntable of the automated parking lot in detail according to the present invention;

FIG. 7 is a side view showing a guide beam of FIG. 6;

FIG. 8 is a side view showing a hand rail of FIG. 6;

FIGS. 9a and 9b are side views showing an opening/closing part of the handrail of FIG. 8;

FIG. 10 is a side view showing fork bars of FIG. 6;

FIG. 11 is a plane view showing the fork bars of FIG. 6;

FIG. 12 is a side view showing a push bar and a sliding stop tap;

FIG. 13 is a plane view showing the push bar and the sliding stop tap;

FIG. 14 is a plane view showing a driving unit of FIG. 8;

FIG. 15 is a side view showing a driving roller of FIG. 14 in detail; and

FIG. 16 is a plane view showing a rotation restriction stopper of FIG. 6.

BEST MODE FOR EMBODYING THE INVENTION

According to the present invention, an automated parking lot turntable, which includes a rack including a plurality of loading forks, and a vehicle conveyer for loading and unloading a vehicle to and from the rack, is characterized of including: a rotary plate which rotates to change the front/rear/left/right directions of an entering vehicle, the front side and the rear side of the rotary plate having an arc shape, which is a part of a circle, with respect to the entering/exiting direction of the vehicle on a plane, the left and right sides of the rotary plate being formed in a straight line in the entering/exiting direction, the rotary plate including a vehicle standby unit for allowing the entering vehicle to be placed thereon, and a driver walking unit formed near to a driver getting on/off door on one of the both sides of the vehicle standby unit on the plane, for allowing a driver to walk thereon; a plurality of fork bars which are formed on the vehicle standby unit of the rotary plate, and include a front fork group and a rear fork group which are perpendicular to the entering/exiting direction of the vehicle and are arranged in the entering/exiting direction of the vehicle so as to support the front wheels and the rear wheels of the vehicle, respectively, and to correspond to the loading forks; a driving unit for rotating and stopping the rotary plate; and a vehicle conveyer including conveying forks which enter or exit between the fork bars.

MODE FOR EMBODYING THE INVENTION

Hereinafter, the present invention will be described in detail with reference to the accompanying drawings.

The suffixes "module" and "unit" used in the following description regarding elements are simply used for easy creation of the present specification, and the terms "module" and "unit" are interchangeably used.

Furthermore, while embodiments of the present invention will be described with reference to the accompanying drawings and the features disclosed in the accompanying drawings, the present invention is not limited by the embodiments.

The terms used herein are normal terms which are widely used and selected in consideration of the functions of the present invention. However, the terms may vary depending on intentions or practice of a person skilled in the art, or the advent of new technology. In addition, terms selected by the applicant may be used in a special case, and in this case, the meanings thereof will be set forth in the corresponding description of the invention. Accordingly, the terms used in the specification should be interpreted based on the practical meanings of the terms and the descriptions made herein, other than the names of the terms.

FIG. 1 is a plane view of entrance/exit levels schematically showing an automated parking lot having a turntable installed therein according to the present invention, FIG. 2 is an elevation view schematically showing the automated parking lot having the turntable installed therein according to the present invention, and FIG. 3 is a front view schematically showing the automated parking lot having the turntable installed therein according to the present invention.

As shown in FIGS. 1 to 3, the automated parking lot may include: a rack 200 having a plurality of loading forks 500; a vehicle conveyer 400 for loading and unloading a vehicle 300 to and from the rack 200; and a turntable 100 rotating to change the front/rear/left/right directions of the vehicle 300 so as to get the vehicle 300 in and out.

When a driver gets the vehicle 300 in, the vehicle 300 is seated on a position where forks bar of the turntable 100 are formed, and, when the driver goes out to one side, the vehicle 300 is moved from the turntable 100 to the vehicle conveyer 400 by conveying forks of the vehicle conveyer 400.

Herein, when the vehicle 300 uses the vehicle conveyer 400 near to the entrance side, the turntable 100 may move the vehicle 300 to the vehicle conveyer 400 near to the entrance side without being rotated.

However, when the vehicle 300 uses the vehicle conveyer 400 near to the exit side, the turntable 100 may be rotated by 180° and may move the vehicle 300 to the vehicle conveyer 400 near to the exit side.

Thereafter, the vehicle 300 may be moved to the loading forks 500 of the rack 200 by the vehicle conveyer 400, and the vehicle 300 may be loaded on the loading forks 500 of the rack 200 by conveying forks of the vehicle conveyer 400.

In addition, when the driver gets the vehicle 300 out, the vehicle conveyer 400 is moved to the loading forks 500 of the rack 200 where the vehicle 300 is loaded, and moves the vehicle 300 to the vehicle conveyer 400 from the loading forks 500 of the rack using the conveying forks of the vehicle conveyer 400.

Thereafter, the vehicle 300 may be moved to the turntable 100 by the vehicle conveyer 400.

Herein, when the vehicle 300 is moved to the turntable 100 by the vehicle conveyer 400 near to the entrance side, the turntable 100 is rotated by 180° and thereby changes the front of the vehicle 300 toward the exit side, such that the driver can easily get the vehicle out.

However, when the vehicle 300 is moved to the turntable 100 by the vehicle conveyer 400 near to the exit side, since the front of the vehicle 300 is toward the exit side without rotating the turntable 100 by 180°, the driver can easily get the vehicle out.

Accordingly, when the vehicle 300 is moved to the turntable 100 by the vehicle conveyer 400 near to the exit side, the turntable 100 is not required to be rotated by 180° and thus the time that the driver waits in order to get the vehicle out can be greatly reduced.

FIG. 4 is an enlarged plane view showing the turntable when the vehicle conveyer near to the entrance side of the automated parking lot is used according to the present invention, and FIG. 5 is an enlarged plane view showing the turntable when the vehicle conveyer near to the exit side of the automated parking lot is used according to the present invention.

As shown in FIGS. 4 and 5, the turntable includes: a rotary plate 101 which rotates to change the front/rear/left/right directions of the vehicle, the front side 101a and the rear side 101b of the rotary plate having an arc shape, which is a part of a circle, on a plane, the right side 101d and the left side 101c of the rotary plate being formed in a straight line, the rotary plate including a driver walking unit 102 formed near to a driver getting on/off door on the plane, for allowing a driver to walk thereon, and a vehicle standby unit 103 formed opposite the driver getting on/off door, for allowing the vehicle to stand by thereon; a plurality of fork bars 110 which are formed on the vehicle standby unit 103 of the rotary plate 101 and are arranged in parallel with one another at predetermined intervals so as to be perpendicular to the advancing direction of the vehicle in the outer straight line section of the rotary plate 101, the plurality of fork bars including a front fork group 112 and a rear fork group 113 spaced from each other to support the front wheels and the rear wheels of the vehicle, respectively; and conveying fork entry/exit passages which have narrow and long spaces formed therein and are open toward conveying forks 410, such that the conveying forks 410 of the vehicle conveyer 400 enter/exit between the fork bars 110 one by one.

As shown in FIG. 4, when the driver gets the vehicle 300 in, the vehicle enters the vehicle standby unit 103 of the turntable, and the front wheels of the vehicle are placed on the front fork group 112 and the rear wheels of the vehicle are placed on the rear fork group 113.

In addition, when the driver goes out through the driver walking unit 102, the vehicle 300 is moved to and loaded on the loading forks 500 of the rack 200 by the conveying forks 410 of the vehicle conveyer 400.

Herein, when the vehicle uses the vehicle conveyer 400 near to the entrance side as shown in FIG. 4, the turntable can move the vehicle to the vehicle conveyer 400 near to the entrance side without rotating the rotary plate 101.

However, when the vehicle uses the vehicle conveyer 400 near to the exit side, the turntable may rotate the rotary plate 101 by 180° and move the vehicle to the vehicle conveyer 400 near to the exit side.

In addition, when the driver gets the vehicle out as shown in FIG. 5, the vehicle conveyer 400 moves to the loading forks 500 of the rack 200 on which the vehicle is loaded, and moves the vehicle to the vehicle standby unit 103 of the turntable using the conveying forks of the vehicle conveyer 400.

Herein, when the vehicle is moved to the vehicle standby unit 103 of the turntable by the vehicle conveyer 400 near to the entrance side, the rotary plate 101 of the turntable is rotated by 180° and thereby changes the front of the vehicle toward the exit side, such that the driver can easily get the vehicle out.

However, when the vehicle is moved to the vehicle standby unit 103 of the turntable by the vehicle conveyer 400 near to the exit side as shown in FIG. 5, since the front of the vehicle is toward the exit side without rotating the rotary plate 101 of the turntable by 180°, the driver can easily get the vehicle out.

Accordingly, when the vehicle is moved to the rotary plate 101 of the turntable by the vehicle conveyer 400 near to the exit side, the rotary plate 101 of the turntable is not required to be rotated by 180° and thus the time that the driver waits in order to get the vehicle out can be greatly reduced.

FIG. 6 is a plane view showing the turntable of the automated parking lot in detail according to the present invention.

As shown in FIG. 6, the turntable of the present invention includes: a rotary plate 101 which rotates to change the front/rear/left/right directions of the vehicle, the front side 101a and the rear side 101b of the rotary plate having an arc shape, which is a part of a circle, on a plane, the right side 101d and the left side 101c of the rotary plate being formed in a straight line, the rotary plate including a driver walking unit 102 formed near to a driver getting on/off door on the plane, for allowing a driver to walk thereon, and a vehicle standby unit 103 formed opposite the driver getting on/off door, for allowing the vehicle to stand by thereon; a plurality of fork bars 110 which are formed on the vehicle standby unit 103 of the rotary plate 101 and are arranged in parallel with one another at predetermined intervals so as to be perpendicular to the advancing direction of the vehicle in the outer straight line section of the rotary plate 101, the plurality of fork bars including a front fork group 112 and a rear fork group 113 spaced from each other to support the front wheels and the rear wheels of the vehicle, respectively; conveying fork entry/exit passages 120 which have narrow and long spaces formed therein and are open toward conveying forks 410, such that the conveying forks 410 of the vehicle conveyer 400 enter/exit between the fork bars 110 one by one; a floor 130 which is installed on the rotary plate 101 except for the front and rear fork groups 112 and 113; and a driving unit 150 for rotating and stopping the rotary plate 101.

Herein, the area of the vehicle standby unit 103 of the rotary plate 101 is the same as the area of the driver walking unit 102 of the rotary plate 101.

According to an exemplary embodiment, the area of the vehicle standby unit 103 of the rotary plate 101 and the area of the driver walking unit 102 of the rotary plate 101 may be different from each other.

For example, the area of the vehicle standby unit 103 of the rotary plate 101 may be larger than the area of the driver walking unit 102 of the rotary plate 101.

In addition, the vehicle standby unit 103 and the driver walking unit 102 of the rotary plate 101 may be symmetrical to each other with reference to a horizontal axis 109 passing through a center point 108 of the rotary plate 101.

A guide beam 160 may be installed on the outer edge of the vehicle standby unit 103 of the rotary plate 101 which is formed in the straight line, for guiding the wheels of the vehicle 300.

In addition, a hand rail 170 may be installed on the outer edge of the driver walking unit 102 of the rotary plate 101 which is formed in the straight line, for the sake of driver's walking safety.

From among the fork bars 110 supporting the front wheels of the vehicle 300, the fork bar on the center portion may be adjusted to be lower than the fork bars on the other portions in height in order to fit the arc of the front wheels of the vehicle 300.

From among the fork bars 110 supporting the rear wheels of the vehicle 300, the fork bar on the center portion may be adjusted to be lower than the fork bars on the other portions in height in order to fit the arc of the rear wheels of the vehicle 300.

In addition, a roller is installed in each of the fork bars 110 supporting the rear wheels of the vehicle 300 so as to have a rotation center placed in the widthwise direction of the fork bar 110, and the upper portion of the roller protrudes upwardly from the fork bars 110, such that the rear wheels of the vehicle 300 can be moved in the lengthwise direction of the fork bars 110 in rolling contact with the roller.

In addition, a roller is installed in each of the fork bars 110 supporting the front wheels of the vehicle 300 so as to have a rotation center placed in the widthwise direction of the fork bars 110, and the upper portion of the roller protrudes upwardly from the fork bar 110, such that the front wheels of the vehicle 300 can be moved in the lengthwise direction of the fork bars 110 in rolling contact with the roller.

The rotary plate 101 may have a rotation restriction stopper 190 installed thereon to restrict the rotation of the rotary plate 101 to 180°.

Herein, the rotation restriction stopper 190 may be disposed on the edge of the front side 101a of the rotary plate 101 having the arc shape, and may be disposed on a line extending from the horizontal axis 109 passing through the center point 108 of the rotary plate 101.

Frames 180 are disposed on the front side 101a and the rear side 101b of the rotary plate 101. The frame 180 disposed on the front side 101a of the rotary plate 101 may have a 0-degree stopper 182 protruding toward the front side 101a of the rotary plate 101, and the frame 180 disposed on the rear side 101b of the rotary plate 101 may have a 180-degree stopper 183 protruding toward the rear side 101b of the rotary plate 101.

FIG. 7 is a side view showing the guide beam of FIG. 6.

As shown in FIG. 7, the guide beam may be formed on the outer edge of the vehicle standby unit of the rotary plate formed in the straight line, and may serve to guide the wheels of the vehicle.

Herein, the guide beam may include a main beam 162 which protrudes upwardly from the floor 130 except for the plurality of fork bars 110 including the front fork group and the rear fork group, and a sub beam 164 which is mounted in the main beam 162, and is ejected from the main beam 162 to the outside or is inserted into the main beam 162 according to a predetermined control signal.

In this case, the sub beam 164 is normally ejected from the main beam 162 toward the front fork group and the rear fork group and thereby guides the wheels of the vehicle, and, when the conveying forks of the vehicle conveyer approach the front fork group and the rear fork group, the ejected sub beam 164 may be inserted into the main beam 162.

In addition, although not shown, the guide beam may further include a sensor for detecting the conveying forks of the vehicle conveyer approaching the front fork group and the rear fork group, and a controller for inserting the ejected sub beam into the main beam according to a signal sensed by the sensor.

FIG. 8 is a side view showing the hand rail of FIG. 6.

As shown in FIG. 8, the hand rail 170 may be installed on the outer edge of the driver walking unit of the rotary plate which is formed in the straight line, and may serve as a handle and a guard for the sake of driver's walking safety.

Herein, the hand rail 170 may be disposed on the floor 130 of the rotary plate, and may include a fixing part 172 fixed to the floor 130 and an opening/closing part 174 disposed at both sides of the fixing part 172.

In addition, the opening/closing part 174 of the hand rail 170 is configured to be opened and closed for the sake of user's safety and for allowing the vehicle to enter and exit, and may be fixed to the outer frame 180.

Herein, the opening/closing part 174 of the hand rail 170 may be rotated toward the outer frame 180 and folded, thereby being opened, and may be rotated toward the fixing part 172 of the hand rail 170 and unfolded, thereby being closed.

The driving unit 150 may be disposed under the floor 130 of the rotary plate.

Herein, the driving unit 150 is for rotating and stopping the rotary plate, and may include an electric motor 152, a pinion gear 154 which is disposed under the rotary plate to transmit the power of the electric motor 152 to the rotary plate, and a plurality of driving rollers (not shown) arranged along the periphery of the pinion gear 154 to rotate the rotary plate.

FIGS. 9a and 9b are side views showing the opening/closing part of the hand rail of FIG. 8.

As shown in FIGS. 9a and 9b, the opening/closing part 174 of the hand rail 170 is configured to be openable and closeable for the sake of driver's safety and for allowing the vehicle to enter and exit, and may be fixed to the outer frame 180.

Herein, the opening/closing part 174 of the hand rail 170 may include a vertical bar 174a and horizontal bars 174b which have one end connected to the frame 180 by means of a rotation screw and the other end connected to the vertical bar 174a by means of a rotation screw.

In addition, a first rotation stopper 174c may be disposed at one end of the vertical bar 174a and a second rotation stopper 174d may be disposed at one end of the horizontal bar 174b formed at the lowest portion As shown in FIG. 9a, the opening/closing part 174 of the hand rail 170 is rotated toward the fixing part 172 of the hand rail 170 and is unfolded, thereby being closed.

In addition, as shown in FIG. 9b, the opening/closing part 174 of the hand rail 170 is rotated toward the outer frame 180 and is folded, thereby being opened.

FIG. 10 is a side view showing the fork bars of FIG. 6.

As shown in FIG. 10, the plurality of fork bars 110 may be formed on the vehicle standby unit of the rotary plate, and may be arranged in parallel with one another at predetermined intervals so as to be perpendicular to the advancing direction of the vehicle in the outer straight line section of the rotary plate.

Herein, the plurality of fork bars 110 include the front fork group for supporting the front wheels of the vehicle, and the rear fork group for supporting the rear wheels of the vehicle.

From among the fork bars 110 supporting the front wheels 310 of the vehicle, the fork bar 110a on the center portion may be adjusted to be lower than the fork bars 110b on the other portions in height in order to fit the arc of the front wheels 310 of the vehicle.

From among the fork bars 110 supporting the rear wheels of the vehicle, the fork bar 110 on the center portion may be adjusted to be lower than the fork bars 110 on the other portions in height in order to fit the arc of the rear wheels of the vehicle 300.

FIG. 11 is a plane view showing the fork bars of FIG. 6.

As shown in FIG. 11, the plurality of fork bars 110 may be formed on the vehicle standby unit of the rotary plate 101 and are arranged in parallel with one another at predetermined intervals so as to be perpendicular to the advancing direction of the vehicle in the outer straight line section of the rotary plate 101, and may include the front fork group 112 and the rear fork group 113 spaced from each other to support the front wheels and the rear wheels of the vehicle, respectively.

Herein, a roller 115 is installed in each of the fork bars 110 of the rear fork group 113 supporting the rear wheels of the vehicle so as to have a rotation center placed in the widthwise direction of the fork bar 110, and the upper portion of the roller 115 protrudes upwardly from the fork bars 110, such that the rear wheels of the vehicle can be moved in the lengthwise direction of the fork bars 110 in rolling contact with the roller.

In addition, a roller is installed in each of the fork bars 110 of the front fork group 112 supporting the front wheels of the vehicle so as to have a rotation center placed in the widthwise direction of the fork bars 110, and the upper portion of the roller 115 protrudes upwardly from the fork bar 110, such that the front wheels of the vehicle can be moved in the lengthwise direction of the fork bars 110 in rolling contact with the roller.

FIG. 12 is a side view showing a push bar and a sliding stop tap, and FIG. 13 is a plane view showing the push bar and the sliding stop tap.

As shown in FIGS. 12 and 13, each of the fork bars 110 has the roller 115 installed therein to have the rotation center placed in the widthwise direction of the fork bar 110, and the upper portion of the roller 115 may protrude upwardly from the fork bar 110.

Herein, the push bar 117 reciprocates between the neighboring fork bars 110 and thereby transversely moves the front wheels and the rear wheels of the vehicle to predetermined positions.

In addition, the stop tap 118 may protrude from the top surface of each fork bar 110 outside the outermost roller 115 located at the free end of each fork bar 110, and thereby stops excessive sliding of the vehicle.

FIG. 14 is a plane view showing the driving unit of FIG. 8.

As shown in FIG. 14, the driving unit may be disposed under the floor of the rotary plate 101.

Herein, the driving unit is for rotating and stopping the rotary plate 101, and may include an electric motor 152, a pinion gear 154 which is disposed under the rotary plate 101 to transmit the power of the electric motor 152 to the rotary plate 101, and a plurality of driving rollers 157 arranged along the periphery of the pinion gear 154 to rotate the rotary plate 101.

Herein, the pinion gear 154 may have an area 156 from which a part of the sawteeth of a predetermined area is removed, and the pinon gear 154 from which the part of the sawteeth is removed may not transmit the power of the electric motor 152 to the rotary plate 101 so as not to rotate the rotary 101 any longer after rotating by 180°.

FIG. 15 is a side view showing the driving roller of FIG. 14.

As shown in FIG. 15, the plurality of driving rollers 157 are arranged along the periphery of the pinion gear, and the inner diameter of the driving roller 157 toward the center of the rotary plate may be smaller than the outer diameter toward the edge of the rotary plate.

Herein, the driving roller 157 may be connected to and installed on a fixing floor 132 disposed under the rotary plate.

For example, the driving roller 157 may be mounted in a fixing member 159 through a rotary shaft, and the fixing member 159 in which the driving roller 157 is mounted may be connected to the fixing floor 132 by means of a screw 158.

FIG. 16 is a plane view showing the rotation restriction stopper of FIG. 6.

As shown in FIG. 16, the rotary plate 101 may have the rotation restriction stopper 190 installed thereon to restrict the rotation of the rotary plate 101 to 180°.

Herein, the rotation restriction stopper 190 may be disposed on the edge of the front side 101a of the rotary plate 101 having the arc shape, and may be disposed on a line extending from the horizontal axis 109 passing through the center point 108 of the rotary plate 101.

Frames 180 are disposed on the front side 101a and the rear side 101b of the rotary plate 101. The frame 180 disposed on the front side 101a of the rotary plate 101 may have a 0-degree stopper 182 protruding toward the front side 101a of the rotary plate 101, and the frame 180 disposed on the rear side 101b of the rotary plate 101 may have a 180-degree stopper 183 protruding toward the rear side 101b of the rotary plate 101.

As described above, the present invention provides the turntable which includes the rotary plate of which the front side and the rear side are formed in an arc shape, which is a part of the circle, on the plane, and of which the left and right sides are formed in the straight line, such that time and space required to get the vehicle in and out can be reduced and parking is efficient.

In addition, in the present invention, since the hand rail is installed on the outer edge of the driver walking unit of the rotary plate which is formed in the straight line, for the sake of driver's walking safety, stability can be enhanced when the driver goes in and out.

In addition, in the present invention, since the guide beam is installed on the outer edge of the vehicle standby unit of the rotary plate which is formed in the straight line, for guiding the wheels of the vehicle, time taken for the driver to seat the vehicle in a designated position when getting the vehicle in and out can be reduced, and the vehicle can be seated in an accurate position.

While preferred embodiments of the present invention have been illustrated and described, the present invention is not limited to the above-described specific embodiments, and various changes can be made by a person skilled in the art without departing from the scope of the present invention claimed herein. In addition, variations should not be understood as departing from the technical idea or prospect of the present invention.

What is claimed is:

1. An automated parking lot turntable comprising a rack which comprises a plurality of loading forks, and a vehicle conveyer for loading and unloading a vehicle to and from the rack, the turntable comprising:
   a rotary plate which rotates to change the front/rear/left/right directions of the vehicle and to move the vehicle, the front side and the rear side of the rotary plate having an arc shape, which is a part of a circle, on a plane, the left and right sides of the rotary plate being formed in a straight line, the rotary plate comprising a driver walking unit formed near to a driver getting on/off door on the plane, for allowing a driver to walk thereon, and a vehicle standby unit formed opposite the driver getting on/off door, for allowing the vehicle to stand by thereon, the rotary plate rotating to change a position of the driver walking unit and a position of the vehicle standby unit;
   a plurality of fork bars which are formed on the vehicle standby unit of the rotary plate and are arranged in parallel with one another at predetermined intervals so as to be perpendicular to the advancing direction of the vehicle in the outer straight line section of the rotary plate, the plurality of fork bars comprising a front fork group and a rear fork group spaced from each other to support the front wheels and the rear wheels of the vehicle, respectively;
   conveying fork entry/exit passages which have narrow and long spaces formed therein and are open toward conveying forks, such that the conveying forks of the vehicle conveyer enter/exit between the fork bars one by one;
   a floor installed on the rotary plate except for the front and rear fork groups; and
   a driving unit for rotating and stopping the rotary plate.

2. The automated parking lot turntable of claim 1, wherein a guide beam is installed on the outer edge of the right side of the vehicle standby unit of the rotary plate which is formed in the straight line, for guiding the wheels of the vehicle.

3. The automated parking lot turntable of claim 2, wherein the guide beam comprises:
   a main beam which protrudes upwardly from the floor except for the front fork group and the rear fork group; and
   a sub beam which is mounted in the main beam, and is ejected to the outside from the main beam or inserted into the main beam according to a predetermined control signal.

4. The automated parking lot turntable of claim 3, wherein:
   the sub beam is normally ejected from the main beam toward the front fork group and the rear fork group and thereby guides the wheels of the vehicle, and
   when the conveying forks of the vehicle conveyer approach the front fork group and the rear fork group, the ejected sub beam is inserted into the main beam.

5. The automated parking lot turntable of claim 3, wherein the guide beam further comprises:
   a sensor for sensing the conveying forks of the vehicle conveyer approaching the front fork group and the rear fork group; and
   a controller for inserting the ejected sub beam into the main beam according to a signal sensed by the sensor.

6. The automated parking lot turntable of claim 1, wherein a hand rail is installed on the outer edge of the driver walking unit of the rotary plate which is formed in the straight line, for the sake of driver's safety.

7. The automated parking lot turntable of claim 1, wherein, from among the fork bars supporting the front wheels of the vehicle, a fork bar on the center portion is adjusted to be lower than fork bars on the other portions in height in order to fit the arc of the front wheels of the vehicle.

8. The automated parking lot turntable of claim 7, further comprising an alarming device which, when the front wheels of the vehicle deviate from a predetermined position of the fork bars on the center portion, generates a warning sound or turns on a warning light as a signal informing of the deviation, such that the position of the vehicle is corrected.

9. The automated parking lot turntable of claim 7, further comprising a vehicle stop signal generating device which, when the front wheels of the vehicle are placed on a predetermined position on the fork bars on the center portion, informs of the correct placement such that the vehicle is stopped.

10. The automated parking lot turntable of claim 1, wherein, from among the fork bars supporting the rear wheels of the vehicle, a fork bars on the center portion is adjusted to be lower than fork bars on the other portions in height in order to fit the arc of the rear wheels of the vehicle.

11. The automated parking lot turntable of claim 1, wherein:
   each of the fork bars supporting the rear wheels of the vehicle has a roller installed therein to have a rotation center placed in the widthwise direction of the fork bar, and
   the roller has an upper portion protruding upwardly from the fork bar, such that the rear wheels of the vehicle are moved in the lengthwise direction of the fork bar in rolling contact with the roller.

12. The automated parking lot turntable of claim 1, wherein each of the fork bars supporting the front wheels of the vehicle has a roller installed therein to have a rotation center placed in the widthwise direction of the fork bar, and
   wherein the roller has an upper portion protruding upwardly from the fork bar, such that the front wheels of the vehicle are moved in the lengthwise direction of the fork bar in rolling contact with the roller.

13. The automated parking lot turntable of claim 11, further comprising a push bar which reciprocates between the neighboring fork bars and thereby transversely moves the front wheels and the rear wheels of the vehicle to a predetermined position.

14. The automated parking lot turntable of claim 11, further comprising a sliding stop tap which protrudes from the top surface of each fork bar outside the outermost roller located at the free end of each fork bar, and thereby stops excessive sliding of the vehicle.

15. The automated parking lot turntable of claim 1, wherein the driving unit comprises:
   an electric motor;
   a pinion gear which is disposed under the rotary plate to transmit power of the electric motor to the rotary plate; and
   a plurality of driving rollers which are arranged along the periphery of the pinion gear, for rotating the rotary plate.

16. The automated parking lot turntable of claim 15, wherein:
   the pinion gear has an area from which a part of sawteeth of a predetermined area is removed, and
   the pinion gear from which the part of the sawteeth is removed does not transmit the power of the electric motor to the rotary plate so as not to rotate the rotary plate any longer after rotating by 180°.

17. The automated parking lot turntable of claim 15, wherein an inner diameter of each of the driving rollers, facing the center of the rotary plate, is smaller than an outer diameter facing the edge of the rotary plate.

18. The automated parking lot turntable of claim 15, wherein the driving rollers are connected to and installed on a fixing floor disposed under the rotary plate.

19. The automated parking lot turntable of claim 1, wherein the rotary plate comprises a rotation restriction stopper for restricting the rotation of the rotary plate to 180°.

20. The automated parking lot turntable of claim 19, wherein the rotation restriction stopper is disposed on an edge of the front side of the rotary plate which is formed in the arc shape, and is placed on a line extending from a horizontal axis passing through the center point of the rotary plate.

21. The automated parking lot turntable of claim 1, wherein:
   frames are disposed on the front side and the rear side of the rotary plate, respectively,
   a 0-degree stopper is formed on the frame disposed on the front side of the rotary plate and protrudes toward the front side of the rotary plate, and
   a 180-degree stopper is formed on the frame disposed on the rear side of the rotary plate and protrudes toward the rear side of the rotary plate.

22. The automated parking lot turntable of claim 12, further comprising a push bar which reciprocates between the neighboring fork bars and thereby transversely moves the front wheels and the rear wheels of the vehicle to a predetermined position.

23. The automated parking lot turntable of claim 12, further comprising a sliding stop tap which protrudes from the top surface of each fork bar outside the outermost roller located at the free end of each fork bar, and thereby stops excessive sliding of the vehicle.

\* \* \* \* \*